J. O. NODLAND.
AWNING SUPPORT.
APPLICATION FILED DEC. 29, 1919.
1,377,784.
Patented May 10, 1921.
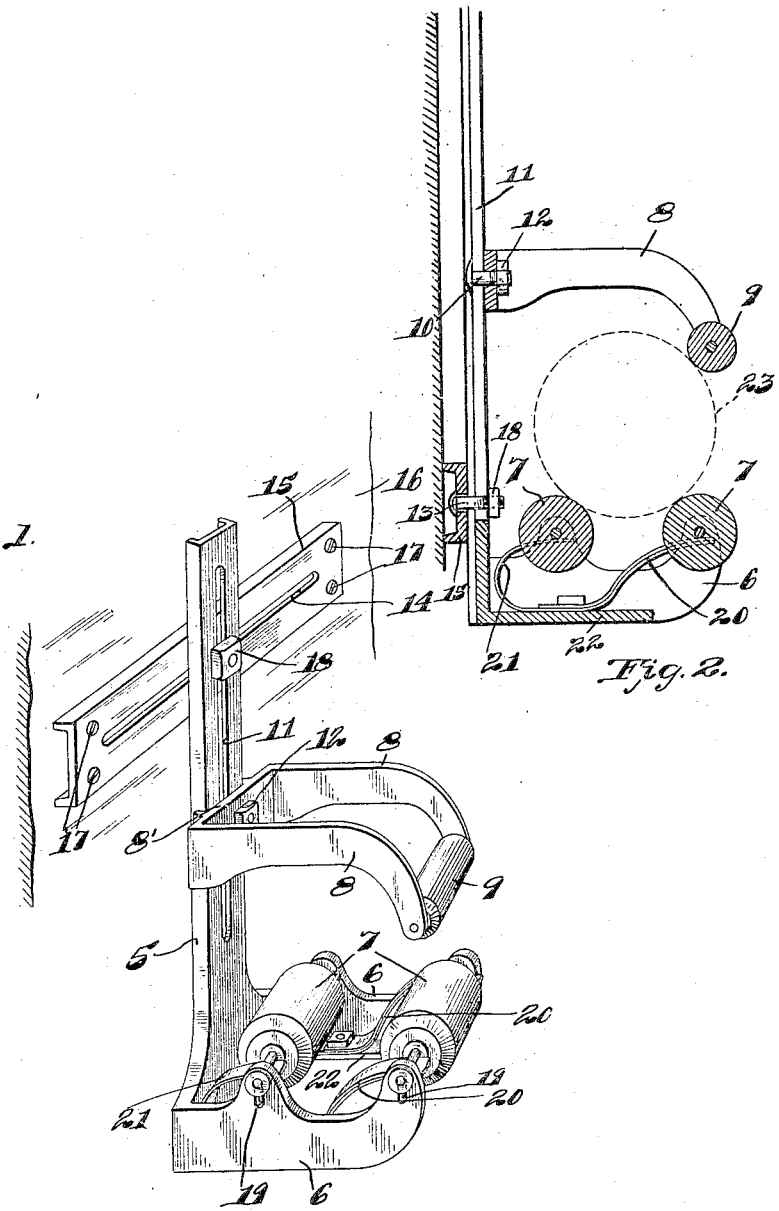
Witnesses:
C. E. Wessels
Thos. Donnelly
Inventor:
Jacob O. Nodland,
By Joshua R. H. Potts
his Attorney.

UNITED STATES PATENT OFFICE.

JACOB O. NODLAND, OF CHICAGO, ILLINOIS.

AWNING-SUPPORT.

1,377,784.    Specification of Letters Patent.    Patented May 10, 1921.

Application filed December 29, 1919. Serial No. 348,182.

*To all whom it may concern:*

Be it known that I, JACOB O. NODLAND, a citizen of the United States, and a resident of the city of Chicago, county of Cook, and State of Illinois, have invented certain new and useful Improvements in Awning-Supports, of which the following is a specification.

My invention relates to new and useful improvements in awning supports, and has for its object the provision in an awning support of means for vertically and longitudinally adjusting the position of the awning support.

Other objects will appear hereinafter.

The invention consists in the combinations and arrangements of parts hereinafter described and claimed.

The invention will be best understood by reference to the accompanying drawings forming a part of this specification, and in which, Figure 1, is a perspective view of my invention, and Fig. 2, is a central vertical sectional view of my invention.

My invention, which is used for supporting the roller upon which an awning is rolled, comprises a supporting member 5, projecting laterally from the lower end of which, at opposite sides, and spaced apart, are roller bearing arms 6 upon which rollers 7 are rotatably mounted. In the form illustrated, the rollers 7 are mounted in slots 19 provided in the arms 6, and springs 20 and 21 and mounted upon flanges 22 which project inwardly from the arm. Coöperating with the rollers 7 is a roller 9, which is rotatably mounted in a pair of spaced arms 8 which are connected by a cross-piece 8'. The member 5 is provided with an elongated slot 11, in which a bolt 10, which projects through the member 8', is projected. Coöperating with the bolt 8 is a nut 12 which serves to bind the member 8' in clamping position with the member 5. The member 5 is secured to a longitudinally extending member 15, which is secured to the wall of the building 16 by means of screws or bolts 17, by means of a bolt 13 which projects through an elongated slot 14 provided in the member 15 and also through the elongated slot 11. A nut 18 coöperating with the bolt 13 serves to bind the members 5 and 15 in a fixed clamping position.

The device is used for supporting the roller 23, (shown in dotted lines in Fig. 2) upon which the awning is rolled when not in use, and the rollers 9 and 7 serve as a guide to the awning in the rolling and unrolling operation. The function of the rollers 7 and the arms 6 is to support the roller when the awning is rolled thereon and prevent a bending or a breaking of the roller. Inasmuch as it is necessary that the exact position of the member 6 be determined relatively to the awning when rolled upon the roller in order to form a firm supporting member, a nice adjustment is necessary, which is difficult to secure when the member 5 is rigidly attached to the building. In order to eliminate the necessity of any fine adjustment of the member 5 when mounting the same upon the building, I have provided a means of vertically adjusting the same. This is accomplished by loosening the nut 18 upon which the adjustment may be made, and then the member 5 may be securely clamped to the member 15 by tightening of the nut 18.

In the use of awning supports of this class, the continued use of the support in one position invariably results in a wear of the awning at one particular point. In order to eliminate this excessive wear of the awning at a particular point, I have provided a means whereby the position of the rollers may be adjusted longitudinally of the awning roller, so that the rollers themselves may contact with the awning itself at different points when in its different positions of adjustment. In order to accomplish this the nut 18 may be loosened and the position of the member 5 relatively to the member 15 may be laterally adjusted. When the adjustment has been accomplished, the members 5 and 15 may again be clamped in binding position.

It is also seen from the description that the relative distance between the rollers 9 and 7 may be adjusted by loosening and tightening the nut 12, but I do not claim this feature as part of my invention inasmuch as the same is old.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. An awning support comprising a supporting arm adapted to engage an awning; and a laterally extending member for adjusting the longitudinal position of said supporting arm laterally relatively to said awning, substantially as described.

2. An awning support comprising a supporting member; means including a horizontal bar for securing said supporting member to a stationary object; and means for adjusting said member vertically and horizontally relatively to said securing means, substantially as described.

3. An awning support comprising a supporting member adapted to engage an awning, said member having an elongated slot therein; a fastening member adapted to be secured to a stationary object, said member having an elongated slot therein; and means adapted to project through said elongated slots for binding said fastening member and said supporting member together, substantially as described.

4. An awning support comprising a supporting member; roller bearing arms secured to the lower end of said supporting member; a slotted bar for securing said supporting member to a stationary object; and means for adjusting the vertical and longitudinal position of said supporting member upon said bar, substantially as described.

In testimony whereof I have signed my name to this specification in the presence of two subscribing witnesses.

JACOB O. NODLAND.

Witnesses:
JOSHUA R. H. POTTS,
ROSE K. TRIB.